United States Patent
Yuan et al.

(10) Patent No.: US 7,760,656 B1
(45) Date of Patent: Jul. 20, 2010

(54) NETWORK DEVICE TESTING SYSTEM

(75) Inventors: Tianson Yuan, Plano, TX (US); Brent A. Scott, Leeton, MO (US); Ezzat S. Atieh, Olathe, KS (US); Wei Chen, Overland Park, KS (US); John H. Bennett, III, Lawrence, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 125 days.

(21) Appl. No.: 12/134,669

(22) Filed: Jun. 6, 2008

(51) Int. Cl.
*G01R 31/08* (2006.01)

(52) U.S. Cl. .................. 370/242; 370/248; 370/249; 370/401; 726/11; 726/23; 702/122; 714/32

(58) Field of Classification Search .......... 370/241, 370/241.1, 242, 244, 245, 248, 249, 250, 370/251, 252, 401; 702/122, 108; 726/11, 726/23–25; 714/32, 41, 715, 716, 717; 709/230
See application file for complete search history.

(56) References Cited

U.S. PATENT DOCUMENTS

| | | | | |
|---|---|---|---|---|
| 5,563,875 | A * | 10/1996 | Hefel et al. | 370/249 |
| 6,775,644 | B2 * | 8/2004 | Myers | 702/186 |
| 7,076,393 | B2 * | 7/2006 | Ormazabal et al. | 702/122 |
| 7,325,252 | B2 * | 1/2008 | Bunker et al. | 726/25 |
| 2003/0115517 | A1 * | 6/2003 | Rutten | 714/718 |
| 2005/0163101 | A1 * | 7/2005 | Ashwood Smith et al. | 370/351 |
| 2007/0291650 | A1 * | 12/2007 | Ormazabal | 370/244 |
| 2008/0196088 | A1 * | 8/2008 | Vinokurov et al. | 726/5 |

OTHER PUBLICATIONS

Spirent Communications, Highest Port Density Performance Analysis System SmartBits 6000C, 2004.
Spirent Communications, Firewall Module WebSuite, 2003.

* cited by examiner

*Primary Examiner*—Ian N Moore

(57) ABSTRACT

A network testing system for a device under test (DUT) uses a test tool to generate test packets provided to the DUT as source traffic and to receive the test packets back from the DUT as destination traffic. Before the test packets are returned from the DUT to the test tool, an external router receives the test packets from the DUT and forwards them back to the DUT. The DUT has a first pair of DUT interfaces coupled to the test tool and a second pair of DUT interfaces coupled to the external router. The DUT has a first virtual router with a first routing table configured to direct test packets received on one of the interfaces in the first pair of DUT interfaces to the external router. The DUT has a second virtual router with a second routing table configured to direct test packets received on one of the interfaces in the second pair of DUT interfaces to the test tool. Thus, test packets output by the test tool traverse the DUT more than once before returning to the test tool.

5 Claims, 3 Drawing Sheets

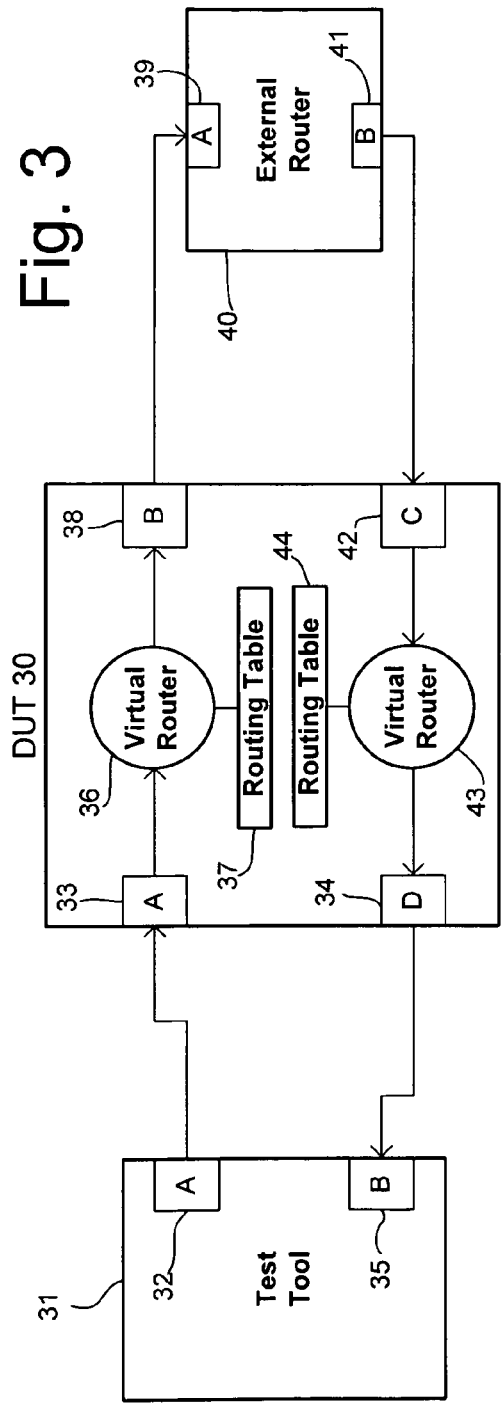
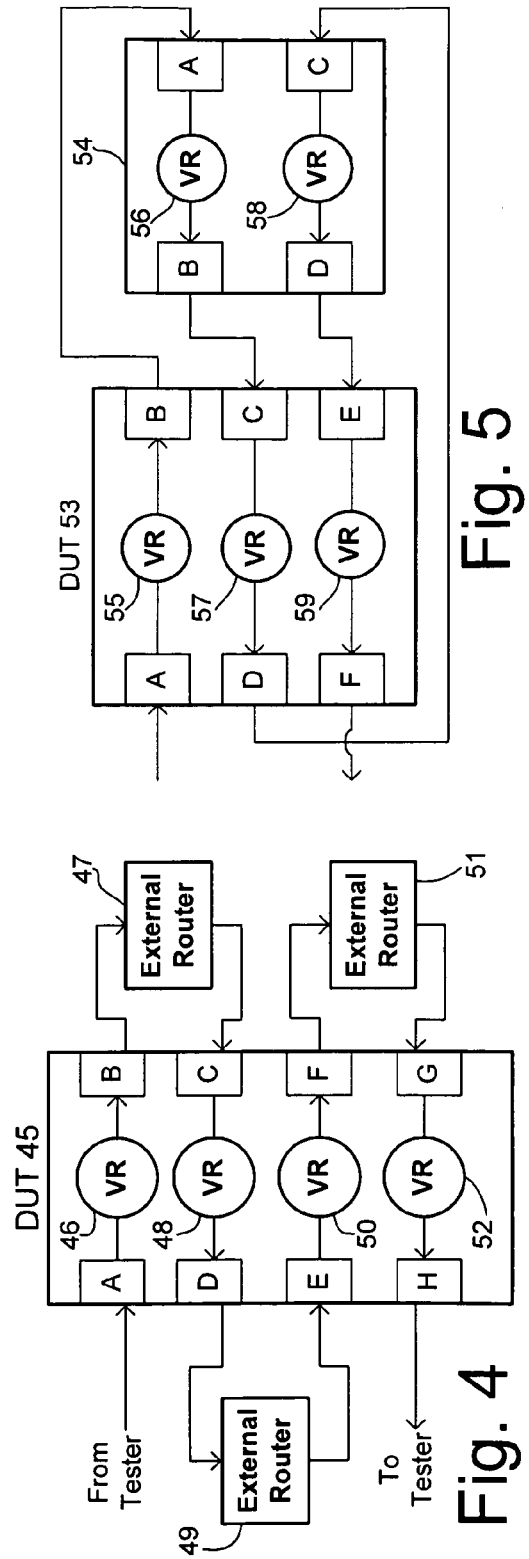

NETWORK DEVICE TESTING SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to performance testing of network devices, and, more specifically, to an apparatus and method for testing network devices at a capacity greater than what can be generated by a single test tool.

Telecommunications network devices such as firewalls, intrusion detection systems, session border controllers, and other known devices having routing and security functions are tested in order to validate their performance by the device manufacturer prior to sale and by the purchaser of the device before putting it into production use in a live network. Network security devices in particular need to be tested in order to establish their reliability under high traffic loads. Desired tests include a maximum connections test for determining the maximum number of sessions sustainable by the device under test (DUT), and a maximum connection rate test for determining the maximum number of new connections per second that the DUT can handle. These capacity tests determine the scalability of the DUT.

Test tools are developed having a reliability and scalability sufficiently high to perform the desired tests. The test tools used must have a guaranteed capacity greater than or equal to the scalability capacity of the DUT. Consequently, test tools are complex and expensive devices typically costing hundreds of thousands of dollars.

One example of a commercially available test tool includes the SmartBits® high port density performance analysis system from Spirent Communications of Calabasas, Calif. A SmartBits® chassis is typically provided with a plurality of multi-port test modules coupled to a personal computer workstation operating graphical user interface (GUI) software and specialized testing software such as the Firewall Module WebSuite also from Spirent Communications.

Once a test tool is acquired, the user is able to conduct the specified tests up to the capacity of the test tool. Over time, the scalability of network devices being purchased and put into use by the test tool user (e.g., a network provider) is increasing. Eventually, new network devices are obtained with a scalability higher than can be tested by the maximum output of the older test tool. Thus, the makers of the test tools produce new versions of the test tool to handle the increased capacity of the new network devices under test, resulting in the need for even more investment in test tools by the network providers.

SUMMARY OF THE INVENTION

The present invention has the advantage of enabling a device under test having a given traffic capacity to be tested using a testing tool with a traffic capacity less than the given traffic capacity. Investment in test tools can be reduced without sacrificing test results at the higher traffic capacity.

In one aspect of the invention, a network testing system comprises a device under test (DUT). A test tool generates test packets provided to the DUT as source traffic, and receives the test packets back from the DUT as destination traffic. Before the test packets are returned from the DUT to the test tool, an external router receives the test packets from the DUT and forwards them back to the DUT. The DUT has a first pair of DUT interfaces coupled to the test tool and a second pair of DUT interfaces coupled to the external router. The DUT has a first virtual router with a first routing table configured to direct test packets received on one of the interfaces in the first pair of DUT interfaces to the external router. The DUT has a second virtual router with a second routing table configured to direct test packets received on one of the interfaces in the second pair of DUT interfaces to the test tool. Thus, test packets output by the test tool traverse the DUT more than once before returning to the test tool.

BRIEF DESCRIPTION OF THE DRAWINGS

FIG. 3 is a block diagram showing a test set-up of the present invention for causing test packets to traverse twice through the device under test.

FIG. 4 is a block diagram showing an alternative embodiment for testing the network device at a capacity four times greater than the capacity of the test tool.

FIG. 5 is a block diagram showing an alternative embodiment wherein multiple external routers have been combined into one external routing device.

DETAILED DESCRIPTION OF PREFERRED EMBODIMENTS

In addition to a conventional test tool and the device under test (DUT), the present invention employs an external router to re-route traffic traversing the DUT multiple times. A virtual router is configured within the DUT so that the first time that a test packet traverses the DUT it is forwarded to the external router instead of back to the test tool. Any number of virtual routers and external routers can be added to double, triple, or even quadruple the amount of traffic being handled by the DUT (e.g., concurrent sessions, sessions/second, and throughput) without additional expensive test tools. In order to perform reliable testing, each external router must be able to reliably support a known performance capacity so that it does not become a bottleneck in the test traffic. In the case where test packets traverse the external router only one time, then the known performance capacity is the same as the capacity of the test tool. When the test packets traverse an external router more than once, then it must support the corresponding multiple of the capacity of the test tool. In any case, the capacity of the external router does not need to be as high as the DUT.

Figure 1:
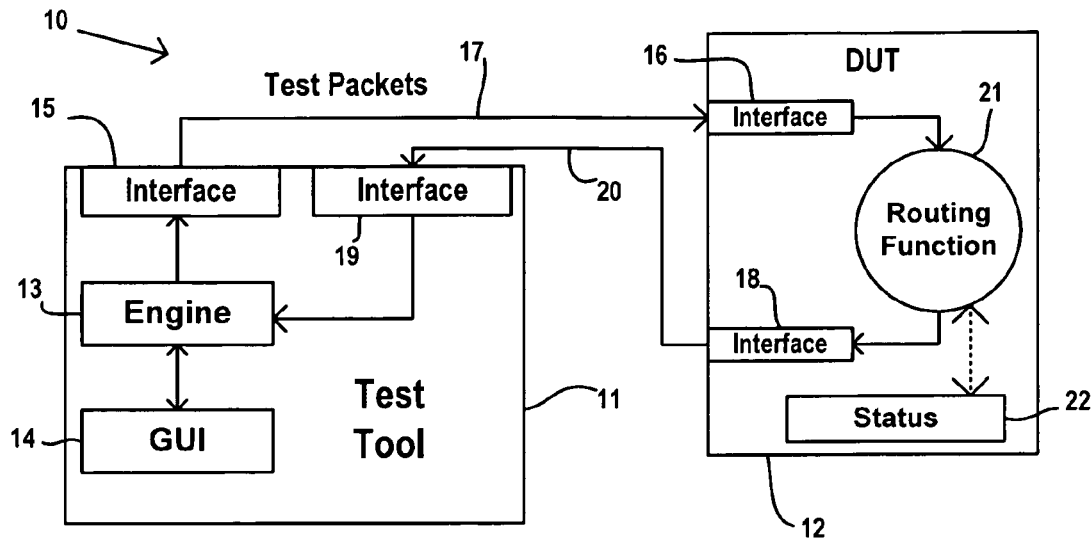
FIG. 1 is a block diagram showing a prior art test tool.

Referring to FIG. 1, a prior art test system 10 is shown with a test tool 11 connected to a DUT 12. Test tool 11 includes a test engine 13 coupled to a GUI 14 and an interface 15. Test packets generated by engine 13 are output by interface 15 to an interface 16 in DUT 12 over a physical connection 17. A second interface 18 in DUT 12 returns the test packets to a second interface 19 in test tool 11 over a physical connection 20. Within DUT 12, a routing function 21 (i.e., a part of the functionality being tested) is configured such that test packets are forwarded back to test tool 11 where the returning test traffic is analyzed for errors. The test results are provided to a user through GUI 14. In addition, DUT 12 typically includes a status monitor 22 that can also report the traffic load and errors encountered while handling the test traffic.

Figure 2:
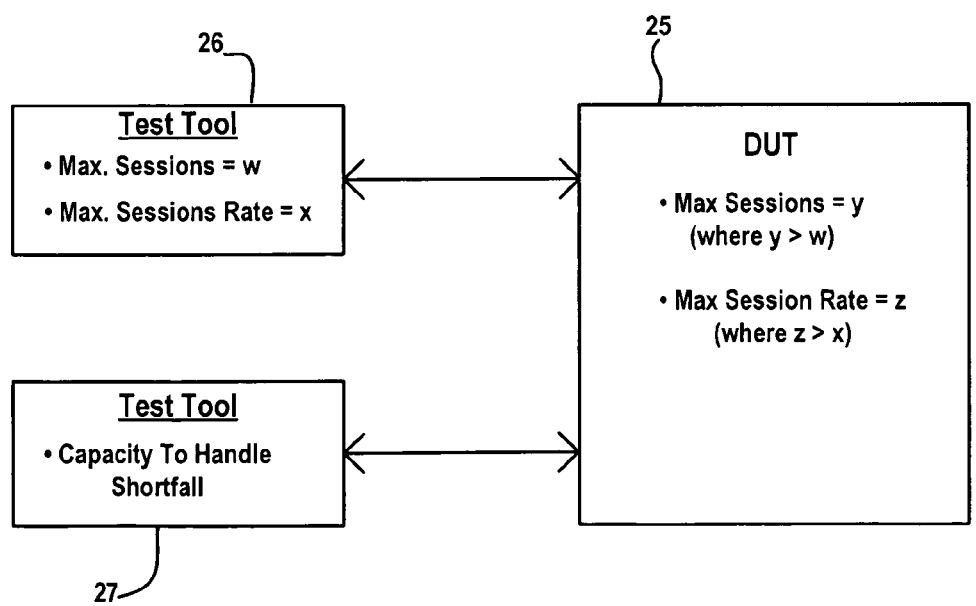
FIG. 2 is a block diagram showing the use of multiple test tools used in the prior art to test a network device having a greater capacity than a single test tool.

In the configuration of FIG. 1, test tool 11 must have a greater scalability capacity than DUT 12 in order to reliably test DUT 12 to its maximum capacity. When new network devices are obtained having greater capacity, the test tool already in the possession of the user may be inadequate to test the new devices. As a result, the user must invest in additional test tools. For example, a new test tool may be acquired at significant expense having capacity greater than the newly acquired network devices. If they are available, multiple test tools may be connected to the device under test as shown in FIG. 2. A DUT 25 has a maximum session capacity designated y and a maximum session rate designated z. A test tool 26 can generate a maximum number of sessions designated w at a maximum session rate designated x. As indicated, y is greater than w and z is greater than x. Therefore, an additional test tool 27 is connected to DUT 25 having sufficient capacity to handle the shortfall in the capacity of test tool 26. To acquire the additional capacity, however, an added investment in test tool hardware and software is still required.

One embodiment of the present invention overcomes the limitations of the prior art by using a test system shown in FIG. 3. A DUT 30 is connected to a conventional test tool 31. Outgoing test packets generated by test tool 31 are sent out through an "A" interface 32 to an "A" interface 33 in DUT 30. Return test packets from DUT 30 are sent out from a "D" interface 34 to a "B" interface 35 in test tool 31. Test packets received by DUT 30 at "A" interface 33 are handled by a virtual router 36 having a routing table 37 configured to direct the test packets to a "B" interface 38 which is further connected to an "A" interface 39 in an external router 40. External router 40 is configured to forward test packets received at interface 39 to a "B" interface 41 for transmission to a "C" interface 42 in DUT 30. A virtual router 43 handles test packets received at interface 42 in accordance with a routing table 44 which is configured to direct the test packets to a "D" interface 34 of DUT 30. Test packets from interface 34 are transmitted to a "B" interface 35 in test tool 31. Thus, test packets output by the test tool 31 traverse DUT 30 two times before returning to test tool 31. If all test packets are received by test tool 31 without error, then the user knows that a maximum session count and/or a maximum session rate detected by test tool 31 are actually one-half the capacity successfully handled by DUT 30. Moreover, DUT 30 preferably includes a status monitor (not shown) that can report the actual values to the user.

FIG. 4 shows a first alternate embodiment for further increasing the scalability capacity that can be tested using a test tool of a given capacity. A DUT 45 receives test packets as source traffic from the test tool at an interface A. A virtual router 46 directs the test packets to an interface "B" which is connected to an external router 47. External router 47 returns the test packets to an interface "C" of DUT 45 wherein a virtual router 48 directs the test packets to an interface "D". An external router 49 is coupled between interface "D" and interface "E" for returning test packets to a virtual router 50 in DUT 45. The routing table in virtual router 50 is configured to direct the test packets to an interface "F" which forwards the test packets to an external router 51. External router 51 returns the test packets to an interface "G" of DUT 45. A virtual router 52 in DUT 45 directs the test packets received at interface "G" to an interface "H" which is connected to the test tool for sending the test packets back to the test tool as destination traffic. Thus, test packets traverse DUT 45 four times. By way of example, if the test tool had a maximum session count of 50,000 then a device under test could be tested for maximum session count of 200,000 without needing a test tool having a 200,000 session capacity.

A minimal implementation of the present invention uses two virtual routers in the device under test and one external router as shown in FIG. 3. Additional traversals of test packets through the device under test can be obtained by adding additional pairs of a virtual router in the device under test and an external router. Thus, by adding three pairs of a virtual router and external router in FIG. 4, four traversals are obtained. The only limitation on the factor by which the tester capacity can be increased is the number of virtual routers and interfaces that may be implemented by the device under test.

The embodiment of FIG. 4 uses a separate external router each time test packets are looped back to the device under test. In FIG. 5, an external router 54 is coupled to DUT 53 wherein one physical device is used to implement external router 54, but virtual routers are provided within external router 54. Thus, test packets received at interface "A" of DUT 53 are directed by a virtual router 55 to an interface "B" which is connected to an interface "A" of external router 54. A virtual router 56 directs test packets from interface "A" to interface "B" of external router 54. The test packets are then connected to an interface "C" of DUT 53 which directs the test packets through a virtual router 57 to interface "D" of DUT 53 which is connected to interface "C" of external router 54. A virtual router 58 directs test packets to an interface "D" of external router 54 which is connected to an interface "E" of DUT 53. A virtual router 59 directs test packets received at interface "E" to an interface "F" which transmits the test packets back to the test tool as destination traffic.

Figure 6:
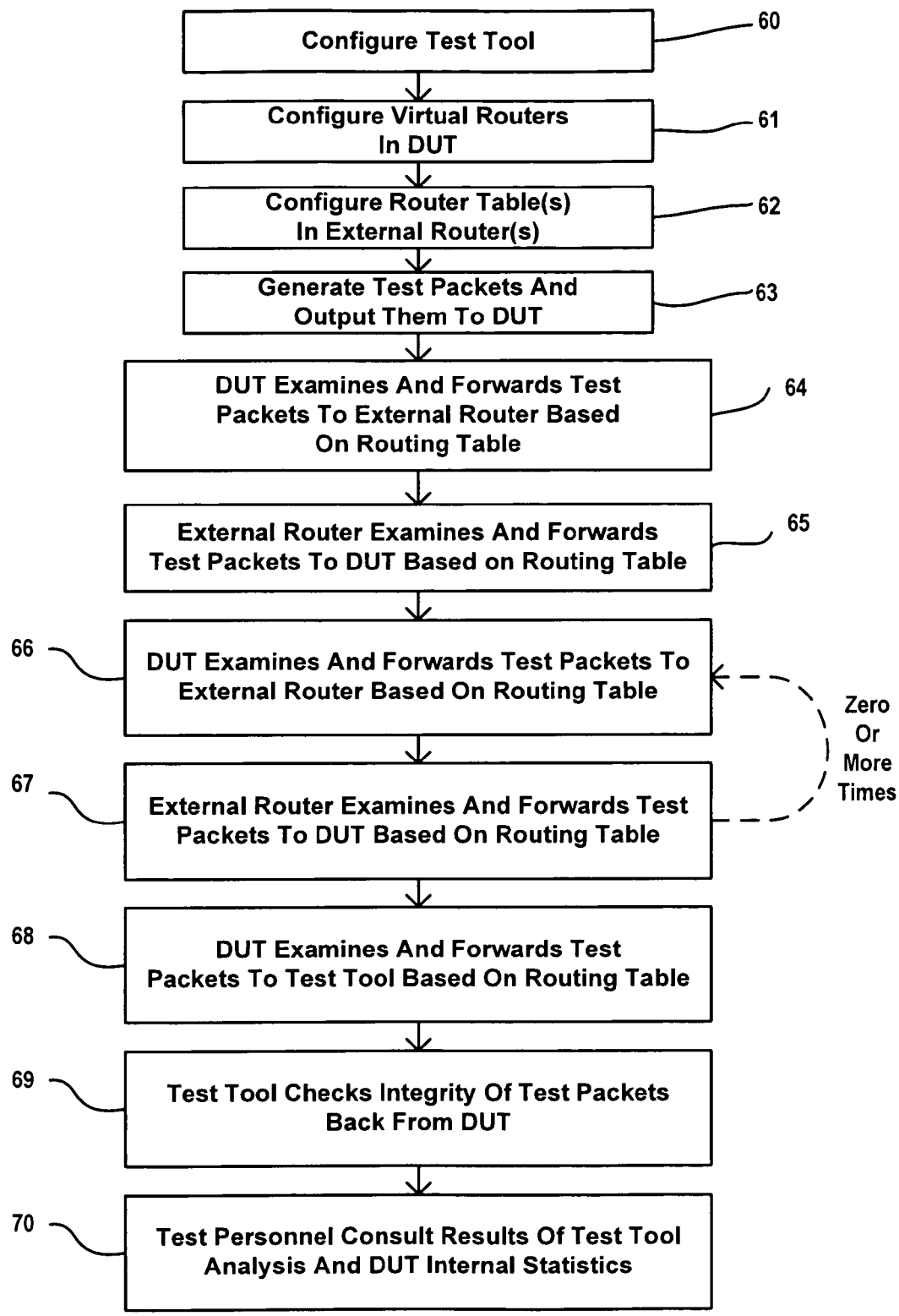
FIG. 6 is a flowchart showing a preferred method of the invention.

FIG. 6 shows a preferred embodiment of the present invention. In step 60, the test tool is configured in order to perform a series of desired tests using test packets having source and destination addresses to be recognized by the DUT for proper routing. The virtual routers in the DUT are configured in step 61 so that when test packets appear at any particular interface of the DUT, they are directed to the appropriate next portion of the loops traversing the DUT. In step 62, routing tables necessary in any external routers are configured in order to forward test packets back to the next succeeding interface of the DUT. After configuration, test packets are generated by the test tool and they are output to the DUT in step 63.

In step 64, the DUT examines and forwards test packets to an external router based on the corresponding routing table of a virtual router in the DUT. The external router examines the test packets in step 65 and forwards them to the DUT based on a routing table in the external router.

If only one extra traversal of the test packets through the DUT is desired, than the method continues with step 68. However, to provide for additional extra traversals through the DUT, step 66 and 67 may be performed one or more times to provide a larger factor of increase in the sessions through the DUT. When there is an extra traversal, the DUT examines and forwards the test packet to an external router based on a respective routing table of the DUT in step 66. In step 67, the external router examines and forwards the test packets back to the DUT based upon a routing table in the external router. In step 68, the DUT examines and forwards the test packets to the test tool based on a respective routing table of the virtual router receiving the test packets (i.e., the DUT consults a respective routing function in the DUT to forward the test packets according to the particular interface where the test packets were received).

The test tool checks the integrity of the test packets received back from the DUT in step 69. The particular scalability tests and the analysis of the results of any particular tests can include any conventional tests and analysis as known in the art. The test personnel or other user consults the results of the test tool analysis and any internal statistics maintained by the DUT in step 70. Based on the re-circulation of test packets between the DUT and one or more external routers, the test tool analysis can be scaled up by the test technician according to the number of traffic loops comprising pairs of virtual routers in the DUT and an external router.

What is claimed is:

1. A network testing system comprising:
   a device under test (DUT) having a first traffic capacity, wherein the DUT is comprised of an intrusion prevention system or a session border controller;
   a test tool generating test packets provided to the DUT as source traffic, and receiving the test packets back from the DUT as destination traffic, wherein the test tool has a second traffic capacity less than the first traffic capacity; and
   at least two external routers receiving the test packets from the DUT and forwarding the test packets back to the DUT;
   wherein the DUT has at least three pairs of DUT interfaces and at least three virtual routers, wherein a first pair of DUT interfaces is coupled to the test tool, a second pair of DUT interfaces is coupled to a first external router, and a third pair of DUT interfaces is coupled to a second external router, wherein the DUT has a first virtual router with a first routing table configured to direct test packets received on one of the interfaces in the first pair of DUT interfaces to the first external router, wherein the DUT has a second virtual router with a second routing table configured to direct test packets received on one of the interfaces in the second pair of DUT interfaces to the second external router, and wherein the DUT has a third virtual router with a third routing table configured to direct test packets received on one of the interfaces in the third pair of DUT interfaces to the test tool;
   whereby test packets output by the test tool traverse the DUT more than twice before returning to the test tool.

2. The system of claim 1 wherein the at least two external routers are comprised of at least two virtual routers within a single device.

3. The system of claim 1 wherein the intrusion prevention system comprises a firewall.

4. A network testing system comprising:
   a test tool generating test packets that are output from a first tester interface as source traffic, wherein the test tool receives the test packets at a second tester interface as destination traffic, wherein the test tool has a first traffic capacity;
   a device under test (DUT) wherein the DUT is comprised of an intrusion prevention system or a session border controller having first, second, third, fourth, fifth, and sixth DUT interfaces, wherein the DUT has a second traffic capacity greater than the first traffic capacity, wherein the first DUT interface is coupled to the first tester interface to receive the source traffic, wherein the sixth DUT interface is coupled to the second tester interface to deliver the destination traffic, wherein the DUT has a first virtual router with a first routing table configured to forward test packets from the first DUT interface to the second DUT interface, wherein the DUT has a second virtual router with a second routing table configured to forward test packets from the third DUT interface to the fourth DUT interface, and wherein the DUT has a third virtual router with a third routing table configured to forward test packets from the fifth DUT interface to the sixth DUT interface;
   a first external router having first and second external router interfaces coupled to the second and third DUT interfaces, respectively, and having a fourth routing table configured to forward test packets received on the first external router interface to the second external router interface, and
   a second external router having third and fourth external router interfaces coupled to the fourth and fifth DUT interfaces, respectively, and having a fifth routing table configured to forward test packets received on the third external router interface to the fourth external router interface.

5. A method of providing network traffic for testing a device under test (DUT), comprising the steps of:
   generating test packets using a test tool, wherein the test tool has a first traffic capacity;
   receiving the test packets from the test tool at the DUT, wherein the DUT is comprised of an intrusion prevention system or a session border controller, wherein the DUT has a second traffic capacity greater than the first traffic capacity;
   consulting a first routing table in a first virtual router in the DUT to forward the test packets received from the test tool to a first external router;
   receiving the test packets from the DUT at the first external router;
   consulting a second routing table in the first external router to forward the test packets received from the DUT back to the DUT;
   receiving the test packets from the first external router at the DUT;
   consulting a third routing table in a second virtual router in the DUT to forward the test packets received from the first external router to a second external router;
   receiving the test packets from the DUT at the second external router;
   consulting a fourth routing table in the second external router to forward the test packets received from the DUT back to the DUT;
   receiving the test packets from the second external router at the DUT;
   consulting a fifth routing table in a third virtual router in the DUT to forward the test packets received from the second external router to the test tool; and
   the test tool checking integrity of the received test packets to detect errors;
   whereby the test packets each traverse the DUT more than two times before being returned to the test tool.

* * * * *